United States Patent
Kumar et al.

(10) Patent No.: US 6,905,863 B2
(45) Date of Patent: Jun. 14, 2005

(54) AEROBIC METHOD OF REMOVING TOTAL DISSOLVED SOLIDS (TDS) FROM TANNERY WASTEWATERS

(75) Inventors: Rita Kumar, New Delhi (IN); Poonam Sharma, New Delhi (IN); Deepa Kachroo Tiku, New Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 47 days.

(21) Appl. No.: 10/393,394

(22) Filed: Mar. 21, 2003

(65) Prior Publication Data

US 2004/0020850 A1 Feb. 5, 2004

Related U.S. Application Data

(60) Provisional application No. 60/365,810, filed on Mar. 21, 2002.

(51) Int. Cl.[7] .............................. C02F 3/00; C12N 1/00; C12N 1/12; B09B 3/00

(52) U.S. Cl. ................. 435/243; 435/252.1; 435/262.5; 210/611; 210/612

(58) Field of Search ................................. 210/611, 612; 435/243, 252.1, 262.5

(56) References Cited

U.S. PATENT DOCUMENTS

2004/0016523 A1 * 1/2004 Kumar et al. .................. 162/5

* cited by examiner

*Primary Examiner*—Chester T. Barry
(74) *Attorney, Agent, or Firm*—Foley & Lardner LLP

(57) ABSTRACT

The present invention relates to a bacterial strain of accession No MTCC 5097 useful for reducing the Total dissolved solids (TDS) levels from both raw as well as electrofloated tannery effluents, a process of preparing innoculum of the strain for reducing the Total dissolved solids (TDS) levels from both raw as well as electrofloated tannery effluents and an aerobic method of reducing Total Dissolved Solids (TDS) from Tannery effluents using the said strain.

15 Claims, No Drawings

AEROBIC METHOD OF REMOVING TOTAL DISSOLVED SOLIDS (TDS) FROM TANNERY WASTEWATERS

CROSS REFERENCE TO RELATED PATENTS AND PATENT APPLICATIONS

The present application claims the benefit of provisional application No. 60/365,810, filed Mar. 21, 2002.

FIELD OF THE PRESENT INVENTION

The present invention relates to a bacterial strain of accession No MTCC 5097 useful for reducing the Total dissolved solids (TDS) levels from both raw as well as electrofloated tannery effluents, a process of preparing inoculum of the strain for reducing the Total dissolved solids (TDS) levels from both raw as well as electrofloated tannery effluents and an aerobic method of reducing Total Dissolved Solids (TDS) from Tannery effluents using the said strain.

BACKGROUND AND PRIOR ART REFERENCES

The fact that the discharge of wastewaters containing hazardous compounds into natural environments, contributes heavily to the accumulation of bioaccumulative and recalcitrant pollutants, is well known. The tanning industry is designated as "Red Industry" due to the high pollution contributed by its solid and liquid wastes. It generates wastes that frequently accumulate in the environment despite controlled efforts. Therefore, our environment is under increasing pressure from solid and liquid wastes emanating from the leather industry.

Leather processing and manufacturing involves a variety of aggressive chemicals and also consumes large quantity of water of which about 90% is discharged as wastewater. Tannery wastewater is a complex mixture of biogenic matter of the hides and a large variety of organic and inorganic chemicals added during the tanning process. Chemicals such as sulfides, sulphates, acids, alkalis, spent halogenated and non-halogenated organic solvents and chromium are used to process and manufacture leather. All these compounds appear in some form or the other in the discharges, resulting in an overall increase in the Total Dissolved solids (TDS) content of the effluent, which consists of both organic as well as inorganic components (M. Bosnic et al., 2000). Pollutants in tannery wastewater also include putrescible organic matter, sulphides, salts and alkalies of Ca, Na, K, Cr, various phenolics, organic acids, aldehydes, amines, preservatives, etc. (Kadam, 1990; Ramanujam, R. A., 1995) which also contribute to the TDS levels of the effluent. A number of such inorganic ions and organic compounds are biologically utilizable. However, some of these remain unreactive and contribute to the overall toxicity load.

The use of sodium chloride during the process of raw material preservation is a major contributor to high TDS levels in tannery wastewaters. Most of the high quality raw hides and skins are preserved through a salting process using between 30 to 50% of common salt compared to the weight of raw hide/skin. This is the most commonly used preservation process because:

Preservation by drying is limited to warm countries, where salt and energy sources are expensive.

Fresh processing of hides and skins, need a source of raw materials, constant in quality and quantity.

Preservation by chilling hides or skins is feasible only in countries where energy is cheap and where slaughtering facilities are already equipped with appropriate cooling facilities.

Other preservative chemicals are suitable for short-term preservation, but not suited for the long-term preservation.

Apart from preservation, some sodium chloride is also necessary for pickling procedures before tanning. The other processing units of tanneries, viz., soaking, liming-deliming, bating and degreasing also contribute to the total TDS load as each unit discharges effluent containing inorganic components like sulphates, sulphides, carbonates, bicarbonates and calcium. Some of the organic components like peptide fractions, tannins and phenolics are also emanated.

The organic load of tannery wastewater and of the treated effluents is usually characterized by its Chemical Oxygen Demand (COD) & Biochemical Oxygen Demand (BOD). To date, more detailed investigations of the organic load of tannery wastewater and its treatment are still missing (Rudolf, 1997). However, an important parameter like TDS is more often than not neglected. This is primarily due to the lack of availability of viable technologies for the reduction of this component of pollution. The TDS concentrations in a tannery effluent can reach up to 7,000 $mgl^{-1}$, which is a matter of concern because of various problems that high TDS loadings can cause.

Total dissolved solids (TDS) tell us the amount of both organic and inorganic dissolved compounds which may in many cases, remain persistent and result in a cumulative toxic effect (Genschow et al, 1996). The major components of inorganic dissolved solids includes the ions of calcium, magnesium, sodium, potassium, bicarbonates, sulphates, chlorides etc. Dissolved inorganic solids are important to the internal balance in certain aquatic organisms. Changes in the amounts of dissolved solids can be harmful because of the density of TDS determines the flow of water in and out of an aquatic organism's cells. High concentration of TDS may reduce the water clarity leading to a decrease in photosynthesis and when added with toxic compounds and heavy metals, leads to increase in temperature. This can often be harmful to many aquatic forms.

TDS not only alters the quality of water, but also contributes to pollution. An amount of 2100 mg/l is the permissible limit of TDS in water as per EPA standards. However, this limit doesn't seem to be stringent enough considering that a TDS more than 1200 mg/l may be toxic to aquatic system as well as humans. EPA has set up an upper limit of 500 mg/l in case of drinking water. Hence, even though the permissible TDS levels in wastewaters are quite high, the above mentioned levels in water are allowed to be drained, due to the lack of availability of suitable methods for the reduction in TDS. Wastewater treatment eliminates most of the suspended solids, large quantities of dissolved organics and nitrogen having hardly any effect on TDS.

Conventionally available TDS reducing technologies involve physicochemical treatment methods. Some of the methods are Reverse Osmosis (RO), Electrodialysis Reversal (EDR), freezing & distillation and Ion exchange.

A) Reverse Osmosis (RO) process: RO process is a membrane separation process in which feed waters flow along the membrane surface under pressure. Purified water permeates the membrane and is collected, while the concentrated water, containing dissolved and undissolved material that does not flow through the membrane, is discharged to the drain or dumped on the ground surface, thus contaminating the ground water as well. This technology involves high cost of operation and maintenance and is presently used only to remove TDS from drinking water.

B) Electrodialysis Reversal (EDR): This process uses semipermeable membrane in which ions migrate through the membrane from a less concentrated to a more concentrated solution as a result of ionic attraction to direct electric current. This process is not suitable for high levels of certain metals ions and is limited in application to water with a TDS of less than 3000 mg/l, besides requiring a high energy input. The problem of disposal of the accumulated solids is also a negating factor for their application to industrial wastewaters.

C) Freezing & distillation: can be used for higher concentrations of TDS, as found in sea or brackish water (greater than 3000 mg/l)

D) Ion Exchange: This technology is based on selective ionic exchange between different ion exchange matrices. However, its use is limited to lower TDS concentrations Thus, biological treatment methods are of utmost importance, as they work without adversely affecting the environment as in the case of physicochemical treatment processes (Bajpai et. al, 1994), which are also an economic burden on the industry because of the expensive infrastructure and maintenance required for their implementation. Besides, the problem of accumulation of such components in some other form, at some other site is another crucial drawback which can be overcome by using biological treatment methods.

The best possible approach towards solving the aforesaid problem, therefore, is to devise biological methods for the reduction of TDS levels.

Since tannery industry utilizes a huge amount of water and contains a considerable amount of total dissolved solids thereby rendering the water resistant to degradation, the need of the hour is to have selected and adapted microorganisms for reduction of TDS from tannery wastewaters (Kapoor et al, 1998, Kumar et al, 1998). The inventors have therefore, emphasized a need to isolate bacteria from natural environment, capable of reducing the level of TDS in wastewaters. Initially, consortia of bacteria were studied but later it was observed that a single bacterium is also equally capable of the same.

OBJECTS OF THE PRESENT INVENTION

The main object of the present invention is to isolate a bacterial strain for reducing the Total dissolved solids (TDS) levels from both raw as well as electrofloated tannery effluents.

Another main object of the present invention is to isolate a bacteria for reducing the Total dissolved solids (TDS) levels from both raw as well as electrofloated tannery effluents.

Yet another object of the present invention is to develop an aerobic method of reducing Total Dissolved Solids (TDS) from Tannery effluents using the bacterial strain B5 (accession no. 5097).

Still another object of the present invention is identify the ratio of effluent to biomass for best results in reducing TDS.

SUMMARY OF THE PRESENT INVENTION

The present invention relates to a bacterial strain of accession No MTCC 5097 useful for reducing the Total dissolved solids (TDS) levels from both raw as well as electrofloated tannery effluents, a process of preparing inoculum of the strain for reducing the Total dissolved solids (TDS) levels from both raw as well as electrofloated tannery effluents and an aerobic method of reducing Total Dissolved Solids (TDS) from Tannery effluents using the said strain.

DETAILED DESCRIPTION OF THE PRESENT INVENTION

The present invention relates to a bacterial strain of accession No MTCC 5097 useful for reducing the Total dissolved solids (TDS) levels from both raw as well as electrofloated tannery effluents, a process of preparing inoculum of the strain for reducing the Total dissolved solids (TDS) levels from both raw as well as electrofloated tannery effluents and an aerobic method of reducing Total Dissolved Solids (TDS) from Tannery effluents using the said strain.

In an embodiment of the present invention, wherein a bacterial strain of accession No MTCC 5097 useful for reducing the Total dissolved solids (TDS) levels from both raw as well as electrofloated tannery effluents.

In yet another embodiment of the present invention, wherein a process of preparing inoculum of the aforementioned strain for reducing the Total dissolved solids (TDS) levels from both raw as well as electrofloated tannery effluents, said method comprising steps of:

a) isolating the strain,
b) culturing the strain on nutrient agar media comprising soil extract and nutrient agar to get pure cultures,
c) inoculating the strain in nutrient broth to obtain starter culture,
d) incubating the starter culture at about 370 C. for about 16-18 hours at preferably 100 rpm,
e) inoculating nutrient broth with the starter culture till culture with optical density of 1.0 is obtained,
f) harvesting the cells from the culture to obtain a pellet,
g) washing the pellet by dissolving in phosphate buffer of 0.05M of pH 6.8,
h) centrifuging the washed pellet,
i) dissolving the washed pellet in minimum of effluent, and
j) homogenizing the dissolved pellet to obtain cell slurry ready for reducing the Total dissolved solids (TDS) levels from tannery effluents.

In still another embodiment of the present invention, wherein culturing the strain in agar medium at about 37+/−2° C. for about 16–24 hours.

In still another embodiment of the present invention, wherein nutrient broth comprises about 5.0 g of peptic digest of animal tissue, about 5.0 g of sodium chloride, about 1.5 g of beef extract, about 1.5 g of yeast extract, and about 0.2 ml of Tween −80.

In still another embodiment of the present invention, wherein the resultant culture is centrifuged at about 6000 rpm for a time duration of about 20 minutes at about 4° C.

In still another embodiment of the present invention, wherein the resultant pellet is washed by dissolving in $PO_4^{-3}$ buffer of concentration 0.05M and pH 6.8.

In still another embodiment of the present invention, wherein an aerobic method of reducing Total Dissolved Solids (TDS) from Tannery effluents using the bacterial strain of accession No. 5097 of claim 1, said comprising steps of:

a) inoculating the effluent with the strain to obtain cell slurry,
b) incubating the cell slurry at about 37° C. at about 100 rpm,
c) estimating TDS levels using the modified APHA method.

In still another embodiment of the present invention, wherein the ratio of effluent to biomass is ranging between 1:3 to 3:1. (Kindly confirm)

In still another embodiment of the present invention, wherein the ratio of effluent to biomass is about 1:1.

In still another embodiment of the present invention, wherein Tannery effluent is both Raw and Electrofloated Tannery Effluent.

In still another embodiment of the present invention, wherein the strain shows % reduction of TDS in Raw Tannery Effluent of about 8.5 in time duration of about 24 hours.

In still another embodiment of the present invention, wherein the strain shows % reduction of TDS in Raw Tannery Effluent of about 8.3 in time duration of about 48 hours.

In still another embodiment of the present invention, wherein the strain shows % reduction of TDS in Electrofloated Tannery Effluent of about 11.1 in time duration of about 24 hours.

In still another embodiment of the present invention, wherein the strain shows % reduction of TDS in Electrofloated Tannery Effluent of about 10.7 in time duration of about 48 hours.

In still another embodiment of the present invention, wherein the pH of the effluent is about 7.0.

The strain of the instant Application is deposited in an International Depository. The Accession No. is MTCC 5097. The depository in the instant Application is called Microbial Type Culture Collection (MTCC) at Chandigarh, INDIA. Recently, it is been granted the status of an International Depository under the Budapest Treaty.

As described in the provisional patent, in the preliminary experiments the bacterial consortia were able to reduce Total Dissolved Solids (TDS) levels of the tannery wastewaters by approximately 16%, over a period of fifteen days. However, later studies were performed to reduce the retention time of the same. This resulted in approximately 11% reduction in the TDS levels of electro floated tannery effluent and approximately 8.0% reduction in the raw effluent within a period of 48 hours by a single bacterial isolate, which is definitely better than the earlier disclosed 15-day retention period for the consortium. Therefore, in the complete patent specification, the results obtained by using the individual bacterial isolate have been presented; being markedly better than those obtained by the bacterial consortium.

The invention provides a novel aerobic biological process for the reduction of Total Dissolved Solids (TDS) from both raw as well as electrofloated tannery wastewaters. Also is disclosed the bacterial strain isolated from a specific site (soil) rich in salts like sulphates, carbonates, chlorides, nitrates etc. The disclosed isolate significantly reduces the levels of Total Dissolved Solids (TDS) load from electrofloated as well as raw tannery wastewaters. The invention also provides a modified standard TDS analysis method.

The present invention provides a novel, aerobic process for the reduction in the levels of TDS in tannery wastewaters and a modified method for the analysis of TDS. Also disclosed is an aerobic bacterial isolate, capable of significantly reducing the TDS load of electrofloated as well as raw tannery effluents.

Present invention relates to a novel, aerobic biological process for the reduction of Total Dissolved Solids (TDS) from tannery wastewaters using a bacterial isolate and a modified method for the analysis of TDS.

The bacterial isolate in the present invention is useful for reducing TDS levels in tannery wastewater.

The bacterial isolate in the present invention has been isolated from the soil obtained from the dried dumped waste of a tannery wastewater treatment plant.

5 gm of freshly sampled soil from the above said site is inoculated in the enrichment medium. Enrichment medium is prepared by adding 200 ml of soil extract with 1.3 gm of Nutrient Broth and 67 $\mu$l of Candid B, autoclaved at 15 lbs for 20 minutes at 121° C.

Soil Extract is prepared from the solid waste collected from each site. 1 kg of the solid waste is dried at 50° C. for 48 hrs until very little moisture remains, similar to garden soil. 400 gm of the dried solid waste from each site is autoclaved with 960 ml single distilled water for 1 hr at 15 lbs. After autoclaving, the sample is centrifuged at 5000 rpm for 10 minutes at 5° C. The supernatant (extract) is collected and stored in sterile containers for preparation of medium for isolation.

The enriched soil samples are serially diluted in $Na_2HPO_4$—$NaH_2PO_4$ buffer (pH 6.8, 0.05 M). 100 $\mu$l from each respective dilution is spread plated in duplicates on media plates with varying concentrations of soil extract and nutrient agar. The plates thus obtained are incubated at 37±2° C. for 16–24 hrs in an inverted position.

The single isolated colony is picked and streaked on a fresh plate containing the same medium. The above step is repeated till pure colonies are obtained.

The above mentioned bacterial isolate is inoculated with the help of sterile, nichrome loop into 15–20 ml sterile nutrient broth (NB) containing (per litre), 5.0 g peptic digest of animal tissue, 5.0 g of sodium chloride, 1.5 g of beef extract, 1.5 g of yeast extract and 0.2 ml Tween-80. The culture is incubated at 37° C. for approximately 16–18 hours in an incubator shaker. For gentle shaking, the incubator shaker is maintained at an appropriate rpm, preferably 100 rpm. After sufficient growth is obtained, the broth was stored at 4° C. till further use. 250 ml of sterile NB is inoculated with 250 $\mu$l of the above prepared starter culture. The flask is kept for incubation at 37° C./100 rpm for 16–18 hours till an optical density (650 nm) Of 1.0 is achieved.

The cells are harvested by centrifuging at an appropriate rpm, preferably 6000 rpm for 20 minutes. The resultant pellet is washed twice by dissolving in minimum quantity of phosphate buffer, 0.05 M, pH 6.8 and recentrifuged under the same rpm and time conditions. During centrifugation, the temperature is maintained at 4° C. The pellet thus obtained, is washed in minimum volume of respective effluent and recentrifuged to minimize any chances of the buffer salts entering into the sample thus reducing the chance of any increase in total dissolved salts by them. The pellets thus obtained are then resuspended in minimum volume of respective effluent, vortexed to make a homogeneous suspension and used for reducing TDS from the tannery.

Both the raw as well as electrofloated effluents are treated for TDS reduction in the present invention. For setting up the TDS reduction experiments, 250 ml of sample is taken in screw-capped conical shake-flasks. The inoculum is added to the effluent samples after checking the pH of the effluents to be preferably around 7.0. Control flask, without any added inocula are also maintained for comparison. The flasks are incubated at 37° C./100 rpm for a period of 24 hours.

For assessing the reduction in the TDS levels, a modification in the standard APHA method is carried out. Approximately 70 ml is withdrawn and processed for analysis. The samples withdrawn are centrifuged in dry and clean centrifuge tubes (rinsed with triple distilled water) at 7000 rpm for 20 minutes, preferably at 4° C. The supernatant is collected immediately in clean and dry containers pre-rinsed with triple distilled water. The supernatant is then filtered through 0.45$\mu$ membrane filters (Millipore). 25 ml of this is then measured with the help of a clean and pre-rinsed measuring cylinder and transferred to a cleaned, overnight-dried, desiccated and pre-weighed beaker. The measuring cylinder is rinsed again with 20 ml of triple distilled water and the same transferred to the beaker containing the sample. The same procedure is repeated for processing all the samples. The beakers are then dried in a hot air oven at 180±2° C. After drying, the beakers are transferred to a vacuum desiccator and cooled for approximately 45 minutes to one hour to attain room temperature and weighed.

TDS (mg/l) is calculated using the following formula:

$$TDS(mg/l)=(A-B)/\text{sample volume}$$

Where,
A=final weight of the beaker with dried filtrate
B=initial weight of the beaker without sample The invention further provides a process for the preparation of inoculum of the said bacterial (MTCC 5097) isolate and using it for reduction of Total Dissolved Solids (TDS) from both raw as well as electrofloated tannery effluents, which comprises:
a) isolating a bacterial isolate from dumped waste soil collected from the effluent treatment plant of a tannery;
b) culturing the said bacterial isolate on nutrient agar media containing to varying concentration of soil extract prepared from the collected soil to get pure cultures;
c) inoculating the said bacterial isolate in nutrient broth containing 0.01% Tween 80 to obtain starter culture;
d) culturing the above bacterial isolate for obtaining required biomass by inoculating appropriate aliquot of nutrient broth, with the starter culture and incubating the above medium at 37° C./100 rpm for 16–18 hours;
e) Centrifuging the resulting culture, after attaining an optical density of 1.0, to obtain pellet, washing the collected pellet by dissolving in $PO_4^{-3}$ buffer, 0.05M, pH 6.8, recentrifuging the pellet;
f) collecting the pellet obtained from step (e), washing by dissolving in 10 ml of respective effluents and recentrifuging to obtain cell pellet for treatability studies;
g) Dissolving the above formed pellet in minimum volume of respective effluents and homogenized by vortexing to obtain cell slurry;
h) inoculating appropriate aliquots of the tannery effluents with the cell slurries obtained in step (g) for TDS reduction studies along with control flasks containing effluent samples without any added inocula;
i) incubating the flasks set up in step (h) at 37° C./100 rpm for 24 hours;
j) Withdrawing samples from the above flasks in 70 ml aliquots and processing them for assessing TDS levels;
k) Analysing TDS of the above samples using modified APHA method as described in (l);
l) Centrifuging the above samples at 8000 rpm for 20 minutes and filtering the supernatant through 0.45µ membrane filters (Millipore) and then using this filtrate for estimation of dry weight.
m) Analysing the TDS removal efficiency of the above said bacterial isolate by comparing with the TDS levels of control samples after 24 hours.

In an embodiment of the present invention, the bacterial isolate is isolated from the dumped waste soil collected from the effluent treatment plant of a tannery, on defined medium.

In another embodiment of the present invention, the above mentioned bacterial isolate is inoculated in nutrient broth containing 0.01% Tween 80 to obtain the starter culture.

In another embodiment of the present invention, the culture of the bacterial isolate is prepared by inoculating nutrient broth with starter culture.

In another embodiment of the present invention, the incubation of the bacterial strains is carried out by gentle agitation at 100 rpm.

In an embodiment of the present invention, the growth of the incubated bacterial strains is carried out at a temperature of 37° C. for a period of 16–18 hours.

In another embodiment of the present invention, the said bacterial isolate was centrifuged at appropriate rpm preferably 6000 rpm for a period of approximately 20 minutes at 4° C., after achieving an optical density of approximately 1.0.

In a further embodiment of the present invention, the resulting pellet is washed by dissolving in minimum quantity of phosphate buffer, 0.05 M, pH 6.8 and recentrifuged using the same rpm and time conditions. During centrifugation, the temperature is maintained at 4° C.

In a further embodiment of the present invention, The pellet thus obtained, is washed by dissolving in 10 ml of effluent and centrifuging under the same conditions, as stated earlier.

In an embodiment of the present invention, the resulting pellet is resuspended in minimum volume of effluent and vortexed to make a homogeneous suspension In one of the embodiment of the present invention, the cell slurry obtained above is used for inoculating the effluent samples for reducing TDS.

The invention further provides a method for the reduction of TDS levels from raw as well as electrofloated tannery effluent samples.

In another embodiment of the present invention, the flasks containing the above inoculum are incubated at 37° C. at 120 rpm for 24 hours.

In another embodiment of the present invention, TDS of the above samples is analysed using modified APHA method, as described in the next embodiment;

In a further embodiment of the present invention, the above samples are centrifuged at 8000 rpm for 20 minutes.

In another embodiment of the present invention, the supernatant is filtered through 0.45µ membrane filters (Millipore) and then used for estimation of dry weight.

In a further embodiment of the present invention, the reduction in Total Dissolved Solids levels is observed over a period of 24 hours.

As described in the provisional patent, in the preliminary experiments the bacterial consortia were able to reduce Total Dissolved Solids (TDS) levels of the tannery wastewaters by approximately 16%, over a period of fifteen days. However, later studies were performed to reduce the retention time of the same. This resulted in approximately 11% reduction in the TDS levels of electro floated tannery effluent and approximately 8.0% reduction in the raw effluent within a period of 48 hours by a single bacterial isolate, which is definitely better than the earlier disclosed 15-day retention period for the consortium. Therefore, in the complete patent specification, the results obtained by using the individual bacterial isolate have been presented; being markedly better than those obtained by the bacterial consortium.

The strain of the instant Application is deposited in an International Depositary. The Accession No. is MTCC 5097. The depository in the instant Application is called Microbial Type Culture Collection (MTCC) at Chandigarh, INDIA. Recently, it is been granted the status of an International Depository under the Budapest Treaty.

The above-stated invention is substantiated with the help of few examples. These examples are merely for illustrations and should not be construed to limit the scope of the invention

EXAMPLE I

Bacteria were isolated from both raw, as well as electrofloated wastewater from the Common Effluent Treatment Plant of a tannery. The pH of the effluent was checked and found to be 7.0±0.2 for raw effluent and 8.3±0.2 for electrofloated effluent, which was neutralized using 1N HCl. The different media used for isolation were:

Media A: Filtered and autoclaved wastewater with agar was used as media. Effluent agar plates were prepared using 2% agar.

Media B: Halophilic medium: The composition of the Halophilic media with different concentrations of NaCl viz., 1%, 2.5%, 5% and 10% used was as follows:

| | |
|---|---|
| KCl | 2 g |
| $MgSO_4 \cdot 7H_2O$ | 20 g |
| Tri-Na Citrate | 3 g |
| Yeast Extract (Oxoid) | 10 g |
| Casein Hydrolysate | 7.5 g |
| $FeCl_2 \cdot 4H_2O$ | 36 mg |
| $MnCl_2 \cdot 4H_2O$ | 0.36 mg |
| pH | 7.0 ± 0.2 |
| Agar | 2% |

Serial dilution plating was carried out by serially diluting the enriched inocula till a dilution of 10–12. Serial dilution was carried out by taking 9 ml aliquots of $Na_2HPO_4$—$NaH_2PO_4$ buffer (pH 6.8, 0.05 M) and inoculating 1 ml of enriched inoculum in the first vial, vortexing and taking 1ml from this vial and diluting the next vial with it, till a $10^{-12}$ dilution was obtained.

100 $\mu$l from each dilution was spread plated, pour plated and loop full was streaked in triplicates on different agar media. The plates thus obtained were incubated at 37±2° C. for 16–24 hrs in an inverted position.

Colonies with distinct morphology were marked according, picked and streaked on to plates of respective media to obtain pure culture. The pure cultures were maintained on the respective slants and stabs, kept at 4° C. for further used for experiments Fifteen morphologically different bacterial isolates were selected and starter cultures were prepared. Loopful of cultures were taken and inoculated in sterile aliquots of nutrient broth, vortexed and kept for incubation at 37° C./120 rpm for 16–18 hrs. The optical density of these starter cultures were checked at 650 nm and kept at 4° C. till further use. Working cultures were prepared for screening their ability to reduce Total Dissolved Solids in electrofloated tannery wastewaters. 100 ml aliquots of sterile NB were inoculated with 100 $\mu$l of respective starter cultures and incubated at 37° C./120 rpm for 16–18 hours. The initial and final optical densities at 650 nm were noted. Cultures at an $OD_{650}$ of 2.0 were taken in equal proportions according to the composition of the consortia and mixed together. The resultant bacterial suspensions were centrifuged at 7000 rpm for 20 minutes at 4° C. The pellets obtained were washed twice using sterile phosphate buffer ($Na_2HPO_4$—$NaH_2PO_4$ pH 6.8, 0.05 M) and resuspended in small volume of the same. This suspension was then used for treatability assay in a ratio of 1:1, i.e., 100 ml of effluent sample was treated with pellet obtained from 100 ml of culture media.

The TDS reduction experiments were carried out in batch cultures samples of electrofloated effluent, in conical shake flasks at 37° C. at 120 rpm for a period of fifteen days. Control flasks without any additional inoculum were also maintained and results compared with these samples. TDS was analysed over a period of fifteen days according to the standard procedure as mentioned in APHA. An increase in the TDS levels were observed on addition of biomass, which could be due to the passage of bacteria passing through GFC filter (pore size 1.2$\mu$), thus contributing to the weight of the residue obtained (Table 1). Hence in all the future experiments a modification in the analysis method was carried out.

EXAMPLE II

The bacterial consortia were prepared again and used for checking their efficiency in TDS reduction of electrofloated tannery effluent, using a modified version of the standard APHA method, as described further. The individual bacteria comprising the consortia were grown in appropriate aliquots of NB till an $O.D._{.650}$ of 1.0. The preparation of the bacterial consortia was conducted in the same manner as described in example I. 100 ml aliquots were treated in a 1:1 ratio with the prepared consortia. Analysis of TDS levels over a period of fifteen days was carried out by the modified standard APHA method, as described below.

The samples were withdrawn in appropriate aliquots and centrifuged at 7000 rpm for a period of 20 minutes. The supernatant was then passed through a 0.45$\mu$ (Millipore) filter. The filtrate was then measured through a clean, pre-rinsed measuring cylinder and transferred to a clean, pre-weighed beaker. The beaker had been rinsed with triple distilled water, baked overnight at 180° C., desiccated at pre-weighed before transferring the sample. The beakers containing the sample were then placed at 180° C. in a hot air oven for overnight drying. The beakers were then desiccated to cool to room temperature and weighed to calculate the weight of the residue. The same was then calculated to find the actual TDS value, expressed in mg/l (Table 2). A maximum TDS reduction of over 4% was recorded after a period of fifteen days in electrofloated samples.

EXAMPLE III

Since the TDS reduction was very less even after 15 days, so bacteria were isolated from the liming process washing water. Bacteria were isolated on nutrient agar plates by using the dilution plating method as described in example I. Isolates were stored as slants and stabs at 4° C. till further use.

Three different consortia were formulated using these bacterial isolates in the same way as described in example I and screened for their efficiency to reduce TDS from electrofloated tannery effluent. Samples were analysed for TDS levels by the modified TDS analysis method as described in example II. A percentage reduction of 13–16% was observed after 15 days.

EXAMPLE IV

Individual bacteria from the consortia, used in example III, were recombined to form different consortia as described previously and screened for their TDS reducing capability against both raw as well as electrofloated tannery effluents. The earlier consortia were showing a 13–16% TDS reduction after 15 days. So, in order to decrease the retention time and also see whether a better performance could be obtained by formulating new consortia.

Experiments were set along with their controls in the same manner as described in example III and analysed over a period of five days. A percentage decrease of up to 8% was observed in the electrofloated samples (Table 4b) and up to 5.0% in the raw effluent (Table 4a).

EXAMPLE V

The consortia giving more than 7.0% TDS reduction and more than 4.5% were selected and the constituent bacterial isolates, screened individually. The individual bacterial pellets were prepared according to the same procedure as described in example II. However, the washing of the cells was carried out by first washing them by phosphate buffer (0.05M, pH 6.8) and finally washing by suspending the phosphate buffer-washed pellet in 10 ml of respective effluents. The suspension was then centrifuged at 7000 rpm for 20 minutes and the cells obtained were resuspended in minimum quantity of the effluent to be used for inoculating appropriate aliquots of both raw as well as electrofloated tannery effluents.

A percentage reduction of up to 9.0% by isolate ET7 in electrofloated samples (Table 5b) and up to 7.0% in raw effluent (Table 5a) was observed over a period of 5 days.

EXAMPLE VI

In order to further improve the TDS reduction efficiency, it was decided to isolate bacteria from different samples taken from different sites of Tannery Effluent Treatment Plant. Solid waste from eight different sites, where the wastewater collected during the processing of hides to leather, were selected. The sites were as follows:

Site A: Dumped waste (dumping site of the sludge and other waste of the waste-water treatment plant).

Site B: Old Tank waste (site which was earlier being used for collecting wastewater from chrome-tanning, dyeing and liming wash-water].

Site C: Lime treatment waste [site where wastewater and solid waste collected after lime treatment of hide].

Site D: Common waste [tank where solid waste and waste water from all the processing of hides collected, viz., from chrome tanning, dyeing and Lime treatment processes].

Site E: Chrome waste [site where wastewater collected after chrome tanning].

Site F: Sludge (Effluent Treatment plant of the tannery).

Site G: Dye Waste (tank where wastewater collected after dyeing of hides).

Site H: Chrome and Dye Waste (tank where wastewater collected after chrome tanning and dyeing).

Extract was prepared from the solid collected from each site. 1 kg of each solid waste was dried at 50° C. for 48 hrs until very little moisture remained and a consistency similar to garden soil was achieved. 400 gm of each of the above dried, solid wastes were autoclaved with 960 ml single distilled water for 1 hr at 15 psi. After autoclaving, the samples were centrifuged at 6000 rpm for 10 minutes at 5° C. The supernatants (extracts) were collected and stored in sterile containers for preparation of different media.

Enrichment media were prepared by adding 200 ml of the respective extracts from each site with 1.3 gm of Nutrient Broth and 67 µl of Candid B, autoclaved at 15 lbs for 20 minutes at 121° C. 5 gms of fresh soil from the respective sites were added and the media incubated at 37° C. at 120 rpm for 48 hrs.

The enriched soil samples were serially diluted in $Na_2HPO_4$—$NaH_2PO_4$ buffer (pH 6.8, 0.05 M). 100 µl from each respective dilution were spread plated in duplicates on media plates with varying concentration of extract and Nutrient Broth from respective site (Medium A: Nutrient Agar, Medium B: Soil Extract (200 ml)+1.3 gm Nutrient Broth with 2% agar, Medium C: Soil Extract with 2% Agar). The plates thus obtained were incubated at 37±2° C. for 16–24 hrs in an inverted position.

Colonies with distinct morphologies were picked and streaked onto plates of respective media to obtain pure culture. The pure cultures were maintained on the respective slants and stabs and kept at 4° C. for further use.

136 bacterial cultures were obtained and consortia designed to screen them for their efficiency to reduce TDS from both electrofloated as well as raw tannery wastewater.

The consortia were prepared in the same manner as described in the previous example and inoculated in 1:1 effluent:biomass ratio as described in example I. The samples were analysed by the modified TDS analysis method as described in example II over a period of 48 hours.

A percentage reduction of up to 9.0% in electrofloated tannery effluent (Table 6b) and up to 7% in raw tannery effluent was observed within 48 hours (Table 6a) as compared to the similar reduction observed after 5-days as shown in example IV and V.

EXAMPLE VII

It was hypothesized that bacteria growing in sites rich in chlorides, sulphates and nitrates, could are better degraders of TDS contributing components. Therefore, soil samples were collected from sites rich in the above salts and bacteria were isolated from the above samples using various culture media.

Enrichment of the bacterial flora was carried out in the following culture media (composition per litre):

| MEDIUM A: The composition of medium A is as follows: | |
|---|---|
| Solution A | 980 ml |
| Solution B | 10 ml |
| Solution C | 10 ml |

Solution A (per 1000 ml of distilled water) comprised of $KNO_3$ (5.0 g), $(NH_4)_2SO_4$ (1.0 g), $K_2HPO_4.3H_2O$ (0.87 g), $KH_2PO_4$ (0.54 g) and Glucose (4.0 g). Solution B was prepared by adding 2 g/100 ml of $MgSO_4.7H_2O$ and Solution C was prepared by dissolving the following salts, per 100 ml of 0.1 N HCl; viz. $CaCl_2.2H_2O$ (0.2 g), $FeSO_4.7H_2O$ (0.1 g), $MnSO_4.H_2O$ (0.05 g), $CuSO_4.5H_2O$ (0.01 g), $Na_2MoO_4.2H_2O$ (0.01 g). All the above solutions were autoclaved at 121° C. at 15 psi for 15 minutes and cooled to 25° C. These were then mixed aseptically and used both for enrichment as well as isolation of bacteria.

MEDIUM B: This medium was prepared using different NaCl percentages, i.e., 1.0, 2.5, 5.0, 10.0 and 12.5. The other components were (per litre of distilled water); $MgCl_2.6H_2O$ (50.0 g), $K_2SO_4$ (5.0 g), $CaCl_2.6H_2O$ (0.2 g), tryptone (5.0 g) and yeast extract (5.0 g). The medium was autoclaved at 121° C. at 15 psi for 15 minutes and cooled to 25° C. and used for enrichment as well as isolation of bacteria.

MEDIUM C: Nutrient Broth medium containing (per litre of distilled water) 5.0 g peptic digest of animal tissue, 5.0 g of sodium chloride, 1.5 g of beef extract, 1.5 g of yeast extract and 0.2 ml Tween-80 was prepared, autoclaved and used for enrichment as well as isolation of bacteria.

Enrichment was carried out at 37° C. for a period of 7 days. The isolation was done as described earlier and pure cultures obtained were stored at 4° C. till further use.

Isolated bacteria were grown individually and formulated into consortia as described earlier and used for screening their efficiency for TDS reduction against electrofloated as well as raw tannery effluents. TDS analysis was carried out according to the modified TDS analysis method as described in example II, over a period of 48 hours (Table 7a and 7b). A reduction of up to 9.3% was observed in electrofloated effluent by consortium EDK2 and up to 5.5% in raw effluent, by consortia RDK3 and RDK5.

EXAMPLE VIII

Individual bacteria constituting the best performing bacterial consortia in example VI, were screened for their capacity to reduce TDS from both raw as well as electrofloated tannery effluents. The bacterial pellets for inoculating the treatability experiments were formed in the same manner as explained in the previous examples. A ratio of 1:1 effluent:biomass ratio was maintained and the TDS levels were analysed over a period of 48 hours using the modified TDS analysis method as described in example II.

A percentage reduction of about 10.3% in electrofloated samples (Table 8b) by isolate Accession No. MTCC 5097 and up to 8.0% in raw effluent (Table 8a) by isolate of Accession No. 5097 was exhibited within a period of 48 hours.

EXAMPLE IX

In order to find out which biomass loading would give the best results, the bacteria exhibiting more than 6.0% in raw tannery effluent and more than 9.0% in electrofloated effluent were re-tested against respective effluent samples with different effluent:biomass ratios viz. 1:0.5 and 1:1. The individual bacteria were cultured in the previously described manner and harvested at a final $O.D._{650}$ of 1.5.

Appropriate sample aliquots were withdrawn at zero hour and 24 hrs for TDS analysis. It was found that the effluent:biomass ratio of 1:1 exhibited better results as compared to the ratio of 1:0.5. Also, increasing the O.D of the cultures to 1.5, exhibited a percentage reduction up to 11.1 in electrofloated and 8.1 in raw effluent, by the bacterial isolate of accession No. MTCC 5097.

TABLE 1

Percentage reduction in TDS of Electrofloated Tannery Effluent with different consortia prepared from bacterial isolates from Tannery Wastewater (Analysis by Standard APHA Method)

| SAMPLE | % REDUCTION IN 15 DAYS |
|---|---|
| T1 | 0.03 |
| T2 | −1.2 |
| T3 | −2.6 |
| T4 | 0.1 |

All values are an average of repeated experiments with a SD of ±0.2%

TABLE 2

Percentage reduction of Electrofloated Tannery Effluent with different consortia (Modified APHA Method)

| SAMPLE | % REDUCTION IN 15 DAYS |
|---|---|
| T1 | 4.9 |
| T2 | 4.7 |
| T3 | 3.1 |
| T4 | 0.7 |

All values are an average of repeated experiments with a SD of ±0.2%

TABLE 3

Percentage reduction in TDS of Electrofloated Tannery Effluent with different consortia prepared from process water isolated

| SAMPLE | % REDUCTION IN 15 DAYS |
|---|---|
| P1 | 13.1 |
| P2 | 15.8 |
| P3 | 13.9 |

All values are an average of repeated experiments with a SD of ±0.2%

TABLE 4a

Percentage reduction in TDS of Raw Tannery Effluents using different consortia formulated from consortia P1, P2 & P3

| SAMPLE | 24 HRS | 48 HRS | 120 HRS |
|---|---|---|---|
| R TC1 | 2.4 | 2.9 | 4.0 |
| R TC2 | 2.6 | 3.9 | 4.5 |
| R TC3 | 2.6 | 2.8 | 4.7 |
| R TC4 | 3.0 | 3.99 | 4.0 |
| R TC5 | 3.6 | 3.8 | 4.1 |
| R TC6 | 3.1 | 3.5 | 4.4 |

All values are an average of repeated experiments with a SD of ±0.2%

TABLE 4b

Percentage reduction in TDS of Electrofloated Tannery Effluents using different consortia formulated from consortia P1, P2 and P3

| SAMPLE | 24 HRS | 48 HRs | 120 HRS |
|---|---|---|---|
| E TC1 | 3.6 | 5.98 | 6.6 |
| E TC2 | 5.1 | 5.6 | 7.3 |
| E TC3 | 2.5 | 4.4 | 6.4 |
| E TC4 | 4.1 | 5.7 | 6.6 |
| E TC5 | 3.0 | 5.0 | 5.8 |
| E TC6 | 3.9 | 4.3 | 7.5 |

All values are an average of repeated experiments with a SD of ±0.2%

TABLE 5a

Percentage reduction in TDS of Raw Tannery Effluent with individual bacteria using modified washing procedure for pellets

| SAMPLES | 24 HRS | 48 HRS | 72 HRS | 96 HRS | 120 HRS |
|---|---|---|---|---|---|
| R T1 | 2.0 | 3.8 | 3.7 | 5.5 | 6.2 |
| R T2 | 3.4 | 4.3 | 5.4 | 6.8 | 6.9 |
| R T3 | 4.3 | 4.7 | 5.1 | 6.3 | 6.6 |
| R T4 | 3.2 | 3.3 | 4.6 | 5.5 | 7.2 |
| R T5 | 2.9 | 3.8 | 4.0 | 5.5 | 5.7 |
| R T6 | 3.8 | 4.5 | 4.6 | 6.2 | 6.5 |
| R T7 | 2.1 | 4.9 | 4.9 | 4.9 | 5.5 |
| R T8 | 2.7 | 4.9 | 5.7 | 6.2 | 6.5 |
| R T9 | 4.2 | 5.0 | 5.1 | 5.2 | 5.2 |
| R T10 | 4.2 | 4.7 | 5.3 | 5.7 | 6.6 |
| R T11 | 2.1 | 3.3 | 3.9 | 4.3 | 4.4 |
| R T12 | 2.8 | 3.4 | 5.7 | 5.7 | 5.7 |
| R T13 | 4.2 | 4.4 | 4.5 | 5.7 | 5.7 |

All values are an average of repeated experiments with a SD of ±0.2%

TABLE 5b

Percentage reduction in TDS of Electrofloated Tannery Effluent with individual bacteria using modified washing procedure for pellets

| SAMPLES | 24 HRS | 48 HRS | 72 HRS | 96 HRS | 120 HRS |
|---|---|---|---|---|---|
| E T1 | 3.0 | 3.2 | 4.6 | 4.7 | 7.4 |
| E T2 | 4.2 | 5.0 | 5.7 | 6.4 | 8.4 |
| E T3 | 3.5 | 5.3 | 5.4 | 5.9 | 8.6 |
| E T4 | 3.5 | 3.9 | 3.96 | 4.7 | 7.2 |

TABLE 5b-continued

Percentage reduction in TDS of Electrofloated Tannery Effluent with individual bacteria using modified washing procedure for pellets

| SAMPLES | 24 HRS | 48 HRS | 72 HRS | 96 HRS | 120 HRS |
|---|---|---|---|---|---|
| E T5 | 4.1 | 4.6 | 5.3 | 6.0 | 8.5 |
| E T6 | 2.4 | 2.8 | 4.5 | 4.8 | 7.5 |
| E T7 | 6.7 | 7.2 | 7.9 | 8.6 | 8.97 |
| E T8 | 3.8 | 6.2 | 6.6 | 7.3 | 7.9 |
| E T9 | 4.7 | 5.3 | 5.9 | 6.6 | 6.8 |
| E T10 | 5.0 | 6.0 | 6.1 | 6.2 | 6.3 |
| E T11 | 4.9 | 5.5 | 6.0 | 6.2 | 6.6 |
| E T12 | 5.1 | 5.8 | 6.3 | 7.7 | 7.7 |
| E T13 | 5.1 | 5.3 | 5.9 | 6.3 | 6.5 |

All values are an average of repeated experiments with a SD of ±2.0%

TABLE 6a

Percentage reduction in TDS of Raw Tannery Effluent with different consortia from different sites of tannery

| SAMPLE | % REDUCTION IN 24 HRS | % REDUCTION IN 48 HRS |
|---|---|---|
| R C1 | 2.8 | 3.8 |
| R C2 | 0.7 | 3.96 |
| R C3 | 4.97 | 7.3 |
| R C4 | 3.79 | 5.1 |
| R C5 | 3.79 | 6.4 |
| R C6 | 2.7 | 2.9 |
| R C7 | 1.2 | 2.3 |
| R C8 | 3.5 | 3.7 |
| R C9 | 2.9 | 3.1 |
| R C10 | 3.6 | 3.7 |
| R C11 | 3.5 | 3.9 |

All values are an average of repeated experiments with a SD of ±0.2%

TABLE 6b

Percentage reduction in TDS of Electrofloated Tannery Effluent with different consortia from different sites of tannery

| SAMPLE | % REDUCTION IN 24 HRS | % REDUCTION IN 48 HRS |
|---|---|---|
| E C1 | 5.5 | 7.9 |
| E C2 | 4.3 | 5.8 |
| E C3 | 4.3 | 8.9 |
| E C4 | 5.6 | 8.9 |
| E C5 | 6.5 | 7.9 |
| E C6 | 4.9 | 5.2 |
| E C7 | 6.2 | 7.99 |
| E C8 | 2.3 | 2.7 |
| E C9 | 2.4 | 2.0 |
| E C10 | 2.7 | 2.6 |
| E C11 | 2.7 | 2.2 |

All values are an average of repeated experiments with a SD of ±0.2%

TABLE 7a

Percentage reduction in TDS of Raw Tannery Effluent with different consortia prepared from bacterial isolates from sites rich in chlorides, sulphates and nitrates

| SAMPLE | % REDUCTION IN 24 HRS | % REDUCTION IN 48 HRS |
|---|---|---|
| R DK1 | 0.6 | 5.0 |
| R DK2 | 0.3 | 4.3 |
| R DK3 | 1.0 | 5.5 |
| R DK4 | 0.6 | 1.95 |
| R DK5 | 4.7 | 5.5 |
| R DK6 | 2.2 | 2.4 |
| R DK7 | 1.2 | 2.5 |
| R DK8 | 1.7 | 1.9 |

All values are an average of repeated experiments with a SD of ±0.2%

TABLE 7b

Percentage reduction in TDS of Electrofloated Tannery Effluent with different consortia prepared from bacterial isolates from sites rich in chlorides, sulphates and nitrates

| SAMPLE | % REDUCTION IN 24 HRS | % REDUCTION IN 48 HRS |
|---|---|---|
| E DK1 | 2.3 | 8.9 |
| E DK2 | 2.7 | 9.3 |
| E DK3 | 2.98 | 8.6 |
| E DK4 | 1.0 | 1.4 |
| E DK5 | 2.7 | 8.2 |
| E DK6 | 1.0 | 1.9 |
| E DK7 | 1.6 | 2.2 |
| E DK8 | 1.0 | 2.2 |

All values are an average of repeated experiments with a SD of ±0.2%

TABLE 8a

Percentage reduction in TDS of Raw Tannery Effluent using individual bacterial isolates

| SAMPLE | % REDUCTION IN 24 HRS | % REDUCTION IN 48 HRS |
|---|---|---|
| R B2 | 5.5 | 7.6 |
| R B4 | 4.1 | 6.1 |
| R B5 (accession No. MTCC 5097) | 7.2 | 8.0 |
| R B10 | 2.2 | 4.6 |
| R B11 | 0.8 | 4.5 |
| R B12 | 0.2 | 2.2 |
| R B13 | 0.1 | 3.1 |
| R B14 | 1.6 | 3.4 |
| R B15 | 2.0 | 3.6 |
| R B16 | 2.8 | 3.2 |
| R B17 | 0.5 | 3.1 |
| R B18 | 1.9 | 4.8 |
| R B19 | 2.7 | 4.5 |
| R B20 | 1.3 | 1.95 |

All values are an average of repeated experiments with a SD of ±0.2%

TABLE 8b

Percentage reduction in TDS of Electrofloated Tannery Effluent using individual bacterial isolates

| SAMPLE | % REDUCTION IN 24 HRS | % REDUCTION IN 48 HRS |
|---|---|---|
| E B2 | 5.1 | 9.1 |
| E B4 | 5.3 | 9.3 |
| E B5 (accession No. MTCC 5097) | 8.9 | 10.3 |
| E B10 | 5.4 | 5.7 |
| E B11 | 7.4 | 8.2 |
| E B12 | 4.9 | 7.0 |
| E B13 | 4.2 | 7.6 |
| E B14 | 5.1 | 8.7 |
| E B15 | 7.6 | 8.2 |
| E B16 | 5.3 | 5.6 |
| E B17 | 7.7 | 7.8 |
| E B18 | 7.3 | 7.6 |
| E B19 | 6.3 | 7.8 |
| E B20 | 5.98 | 7.7 |

All values are an average of repeated experiments with a SD of ±0.2%

TABLE 9a

Percentage reduction in TDS of Raw Tannery Effluent using different biomass loadings

| | PERCENTAGE REDUCTION IN 24 HRS | |
|---|---|---|
| SAMPLE | 1:0.5 | 1:1 |
| R B1 | 5.67 | 7.1 |
| R B2 | 4.94 | 7.5 |
| R B3 | 4.38 | 7.3 |
| R B4 | 1.05 | 5.4 |
| R B5 (accession No. 5097) | 0.40 | 8.1 |
| R B6 | 2.20 | 8.0 |
| R B7 | 2.50 | 7.94 |
| R B8 | 0.57 | 3.97 |
| R B9 | 0.80 | 5.0 |

All values are an average of repeated experiments with an S.D. of ±0.2%

TABLE 9b

Percentage reduction in TDS of Electrofloated Tannery Effluent using different biomass loadings

| | PERCENTAGE REDUCTION IN 24 HRS | |
|---|---|---|
| SAMPLE | 1:0.5 | 1:1 |
| E B1 | 4.9 | 4.12 |
| E B2 | 4.5 | 4.54 |
| E B3 | 4.8 | 6.0 |
| E B4 | 4.2 | 5.6 |
| E B5 (accession No. 5097 | 5.5 | 11.1 |
| E B6 | 5.6 | 5.3 |
| E B7 | 6.2 | 7.3 |
| E B8 | 4.0 | 6.5 |
| E B9 | 4.9 | 5.9 |

All values are an average of repeated experiments with a SD of ±2.0%

ADVANTAGES OF THE PRESENT INVENTION

1. The isolated bacterium is capable of reducing the TDS levels of the tannery effluents in a reproducible manner.
2. The naturally isolated bacterium is non-pathogenic and can be cultured on simple nutrient media without any economic burden.
3. This kind of bacterial reduction of TDS reduction from raw as well as tannery effluents is novel.

What is claimed is:

1. A bacterial strain of accession No MTCC 5097 useful for reducing the total dissolved solids (TDS) levels from both raw as well as electrofloated tannery effluents.

2. A process of preparing inoculum of the strain of claim 1 for reducing the total dissolved solids (TDS) levels from both raw as well as electrofloated tannery effluents, said method comprising steps of:
   a) isolating the strain,
   b) culturing the strain on nutrient agar media comprising soil extract and nutrient agar to get pure cultures,
   c) inoculating the strain in nutrient broth to obtain starter culture,
   d) incubating the starter culture at about 370 C. for about 16–18 hours at preferably 100 rpm,
   e) inoculating nutrient broth with the starter culture until culture with optical density of 1.0 is obtained,
   f) harvesting the cells from the culture to obtain a pellet,
   g) washing the pellet by dissolving in phosphate buffer of 0.05M of pH 6.8,
   h) centrifuging the washed pellet,
   i) dissolving the washed pellet in minimum of effluent, and
   j) homogenizing the dissolved pellet to obtain cell slurry ready for reducing the total dissolved solids (TDS) levels from tannery effluents.

3. A process as claimed in claim 2, wherein culturing the strain in agar medium takes place at about 37±2° C. for about 16–24 hours.

4. A process as claimed in claim 2, wherein nutrient broth comprises about 5.0 g of peptic digest of animal tissue, about 5.0 g of sodium chloride, about 1.5 g of beef extract, about 1.5 g of yeast extract, and about 0.2 ml of Tween -80.

5. A process as claimed in claim 2, wherein the resultant culture is centrifuged at about 6000 rpm for a time duration of about 20 minutes at about 4° C.

6. A process as claimed in claim 2, wherein the resultant pellet is washed by dissolving in $PO_4^{-3}$ buffer of concentration 0.05M and pH 6.8.

7. An aerobic method of reducing total dissolved solids (TDS) from tannery effluents using the bacterial strain of Accession No. 5097 of claim 1, said method comprising steps of:
   a) inoculating the effluent with the strain to obtain cell slurry,
   b) incubating the cell slurry at about 37° C. at about 100 rpm,
   c) estimating TDS levels using the modified APHA method.

8. A method as claimed in claim 7, wherein the ratio of effluent to biomass ranges from 1:3 to 3:1.

9. A method as claimed in claim 7, wherein the ratio of effluent to biomass is about 1:1.

10. A method as claimed in claim 7, wherein the tannery effluent is both raw and electrofloated tannery effluent.

11. A method as claimed in claim 7, wherein the strain shows % reduction of TDS in raw tannery effluent of about 8.5 in time duration of about 24 hours.

12. A method as claimed in claim 7, wherein the strain shows % reduction of TDS in raw tannery effluent of about 8.3 in time duration of about 48 hours.

13. A method as claimed in claim 7, wherein the strain shows % reduction of TDS in electrofloated tannery effluent of about 11.1 in time duration of about 24 hours.

14. A method as claimed in claim 7, wherein the strain shows % reduction of TDS in electrofloated tannery effluent of about 10.7 in time duration of about 48 hours.

15. A method as claimed in claim 7, wherein the pH of the effluent is about 7.0.

* * * * *